United States Patent
King et al.

(10) Patent No.: US 6,278,969 B1
(45) Date of Patent: Aug. 21, 2001

(54) METHOD AND SYSTEM FOR IMPROVING MACHINE TRANSLATION ACCURACY USING TRANSLATION MEMORY

(75) Inventors: Dennis D. King; Richard J. Redpath, both of Cary, NC (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/376,615

(22) Filed: Aug. 18, 1999

(51) Int. Cl.[7] .................................................. G06F 17/28
(52) U.S. Cl. ........................................................ 704/7; 704/2
(58) Field of Search ............................... 704/2–7, 10, 277, 704/536

(56) References Cited

U.S. PATENT DOCUMENTS

| | | | |
|---|---|---|---|
| 5,579,224 | * 11/1996 | Hirakawa et al. | 704/7 |
| 5,768,603 | * 6/1998 | Brown et al. | 704/2 |
| 5,867,811 | * 2/1999 | O'Donoghue | 704/1 |
| 5,991,710 | * 11/1999 | Papineni et al. | 704/2 |

* cited by examiner

Primary Examiner—Patrick N. Edouard
(74) Attorney, Agent, or Firm—A. Bruce Clay

(57) ABSTRACT

A combination of Machine Translation (MT) techniques are used with a 'Hybrid' Translation Memory (HTM)database. The HTM database stores malformed translated sentences matched with their correct translations. Each sentence that is translated with MT is analyzed by the MT algorithms to determine a value for the accuracy of the translation. If the accuracy is greater than or equal to a preset tolerance level, the sentence is considered to be translated sufficiently well. Therefore, no database need be checked for all the sufficiently translated sentences. However, if the accuracy is below the tolerance, an HTM database is checked for the same bad translation and if found, replaced with the matching correct translation.

9 Claims, 5 Drawing Sheets

Client 300

METHOD AND SYSTEM FOR IMPROVING MACHINE TRANSLATION ACCURACY USING TRANSLATION MEMORY

FIELD OF THE INVENTION

This invention relates in general to computer software, and in particular to a method and system for providing a language translation process in a network interface. More particularly, the present invention relates to a method and system by which application developers can utilize machine translation to translate one language to another and statistically fix malformed translations, thereby increasing the accuracy of the machine translation.

BACKGROUND OF THE INVENTION

Internet, also referred to as an "internetwork," is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of on-line public records may reduce operating costs. Of increasing importance is the use of the Internet and commercial transactions. Increasing amounts of commerce occur on the Internet. Entire businesses exist only on the Internet to sell goods and services to consumers. Other businesses are establishing a presence on the Internet to reach new consumers.

Currently, the most commonly employed method of transferring data over the Internet is to employ the World Wide Web environment, also called simply "The Web." Other Internet resources exist for transferring information, such as File Transfer Protocol (FTP) and Gopher, but have not achieved the popularity of the Web. In the Web environment, servers and clients affect data transaction using the Hypertext Transfer Protocol (HTTP), a known protocol for handling the transfer of various data files (e.g., text, still graphic images, audio, motion video, etc.). Information is formatted for presentation to users by standard page description language, the Hypertext Markup Language (HTML). In addition to basic presentation formatting, HTML allows developers to specify "links" to other web resources identified by a Uniform Resource Locator (URL). The URL is a special syntax identifier defining a communications path to specific information. Each logical block of information accessible to a client, called a "page" or a "Web page," is identified by a URL. The URL provides a universal, consistent method for finding and accessing this information, not necessarily for the user, but mostly for the user's Web "browser." A browser is a program capable of submitting a request for information identified by a URL at the client machine. Retrieval of information on the Web is generally accomplished with an HTML compatible browser. The Internet also is widely used to transfer applications to users using browsers.

Algorithms have been developed to parse grammar of one language and translate that grammar and meaning to another language in a process known as Machine Translation. Machine Translation has limited accuracy due to the idiosyncracies of language such as idiomatic usage and context. One alternative to algorithms for Machine Translation is known as "in-memory translation" in which a sentence or phrase in one language is found in a database with its counterpart translation. Counterpart translation is meant to be the domain (idiom/context) specific translation of the sentence/phrase. This database of translations is accurate because it was created manually by human translators. The downside to this process is that the database for a limited domain can contain over 17 million sentences and phrases as a result of continuous updating and the addition of new entries which greatly impacts performance in a negative manner. Machine Translation is not limited by domain, but its accuracy is less than in-memory translation.

SUMMARY OF THE INVENTION

Accordingly, an object of the present invention is to provide a process to use machine translation function with an in-memory translation for malformed sentences rather than correct sentences.

Another object of the invention is to provide means for statistically deciding whether or not to use in-memory translation of possible malformed sentences.

Yet another object of the invention is to provide means for reducing the necessity of maintaining a large database of phrases for in-memory translation.

These and other features, aspects, and advantages of the present invention will become better understood with reference to the following description, appended claims, and accompanying drawings. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
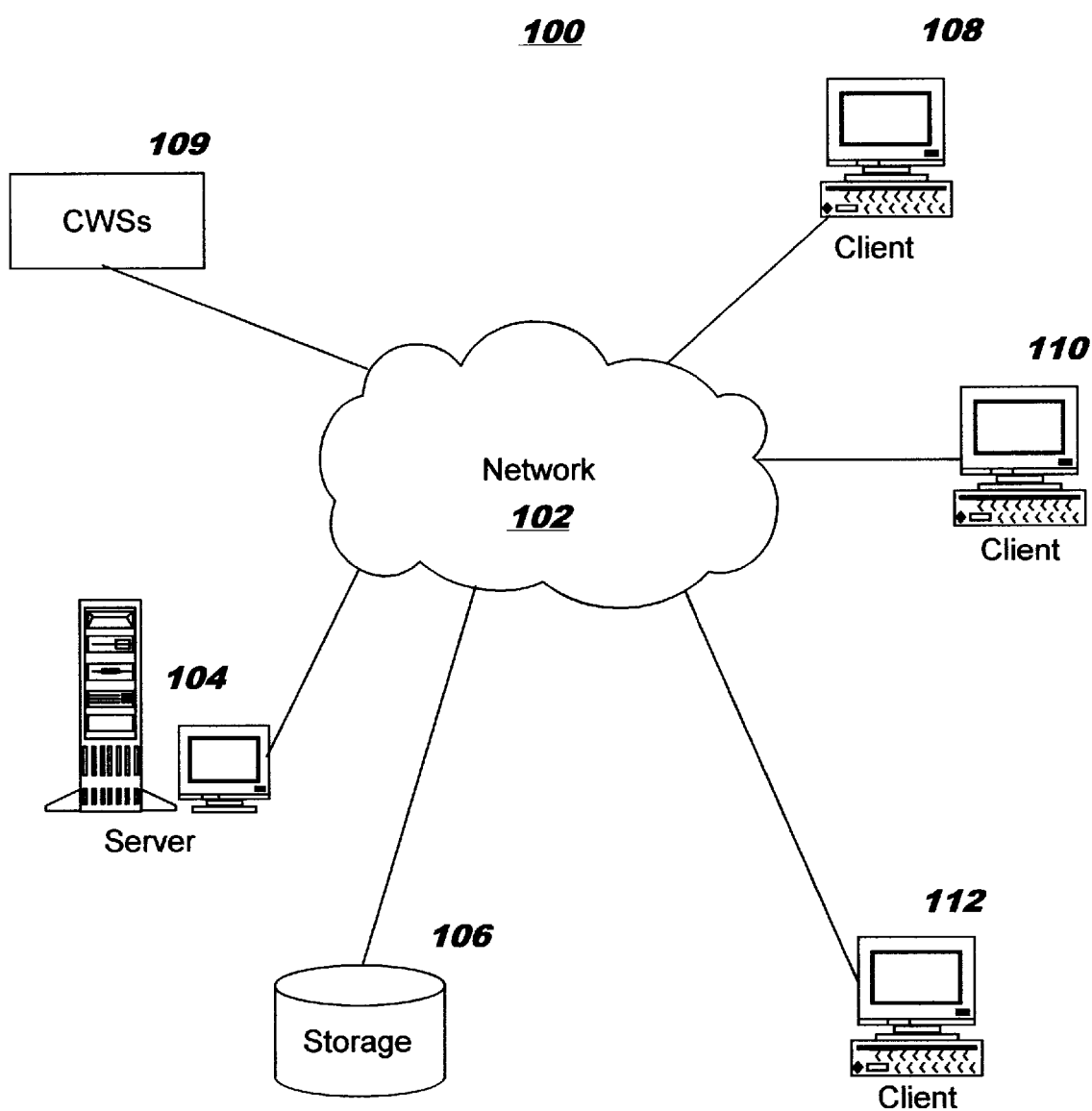
FIG. 1 is a pictorial representation of a distributed data processing system which may be utilized to implement the present invention.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage Unit 106. In addition, a group of cooperating web servers CWSs 109 is connected to network 102. Clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Users located at these clients may, for example, without limitation, access various resources through browsers.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is the backbone of high-speed data communication lines between major nodes or host computers, consisting of thousands of commercial, government, educational, and other computer systems that route data and messages. Of course, distributed data processing system 100 also may be implemented as a number of different types of networks, such as, for example, an Intranet, a local area network (LAN), or a wide area network (WAN). FIG. 1 is intended as an example, and not as an architectural limitation for the processes of the present invention.

Figure 2:
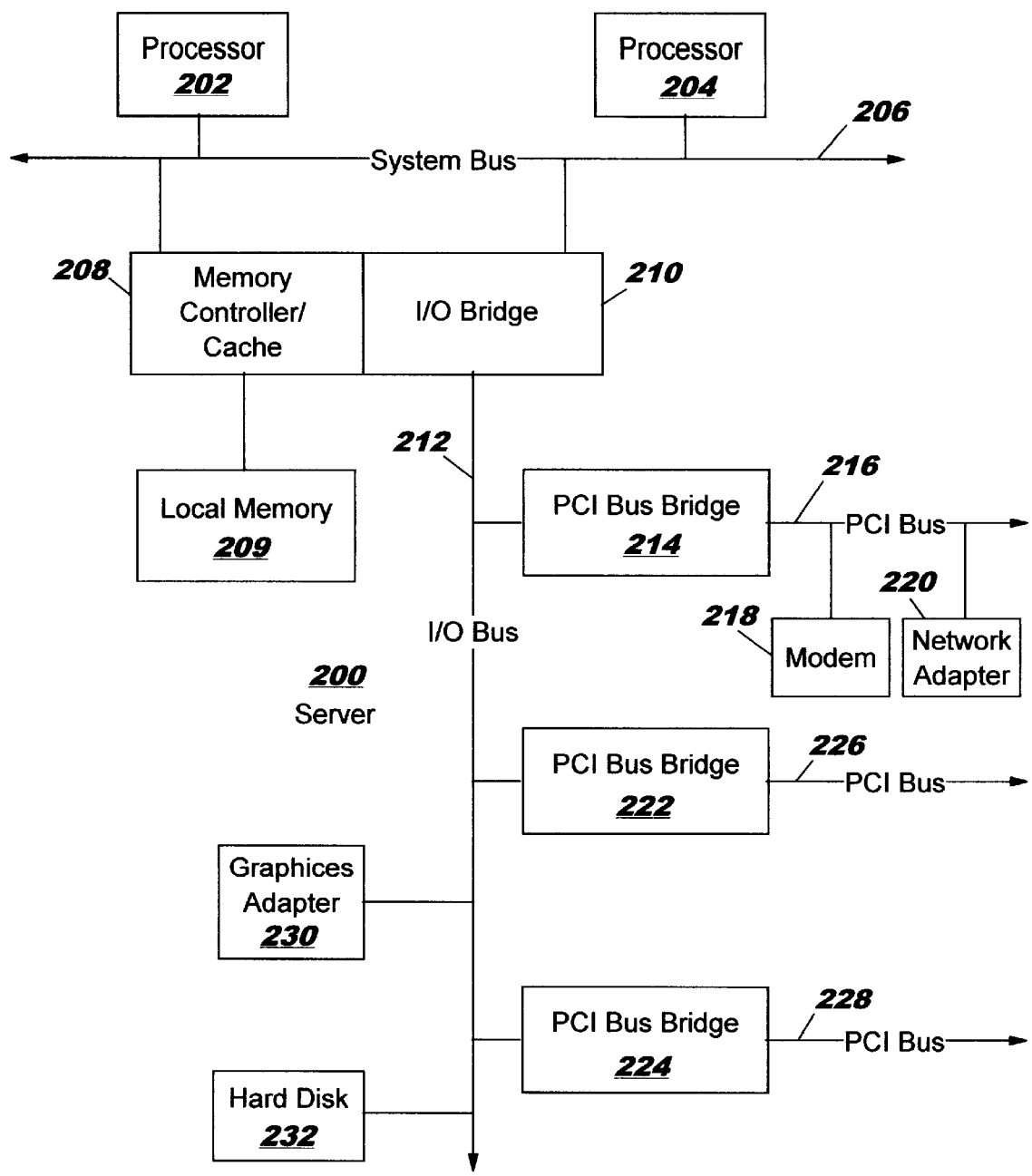
FIG. 2 is a block diagram depicting a data processing system, which may be implemented as a server in accordance with the present invention.

Referring to FIG. 2, a block diagram depicts a data processing system, which may be implemented as a server, such as server 104 in FIG. 1, in accordance with the present invention. Data processing system 200 maybe a symmetric multi processor (SMP) system including a plurality of processors 202 and 204 connected to system bus 206. Alternatively, a single processor system may be employed. Also connected to system bus 206 is memory controller/cache 280, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drive and the like, also may be used in addition to or in place of the hardware detected. The depicted example is not meant to imply architectural limitations with respect to the present invention.

The data processing system depicted in FIG. 2 may be, for example, an IBM RISC/System 6000 system, a product of International Business Machines Corp. in Armonk, N.Y., running the Advanced Interactive Executive (AIX) operating system.

Figure 3:
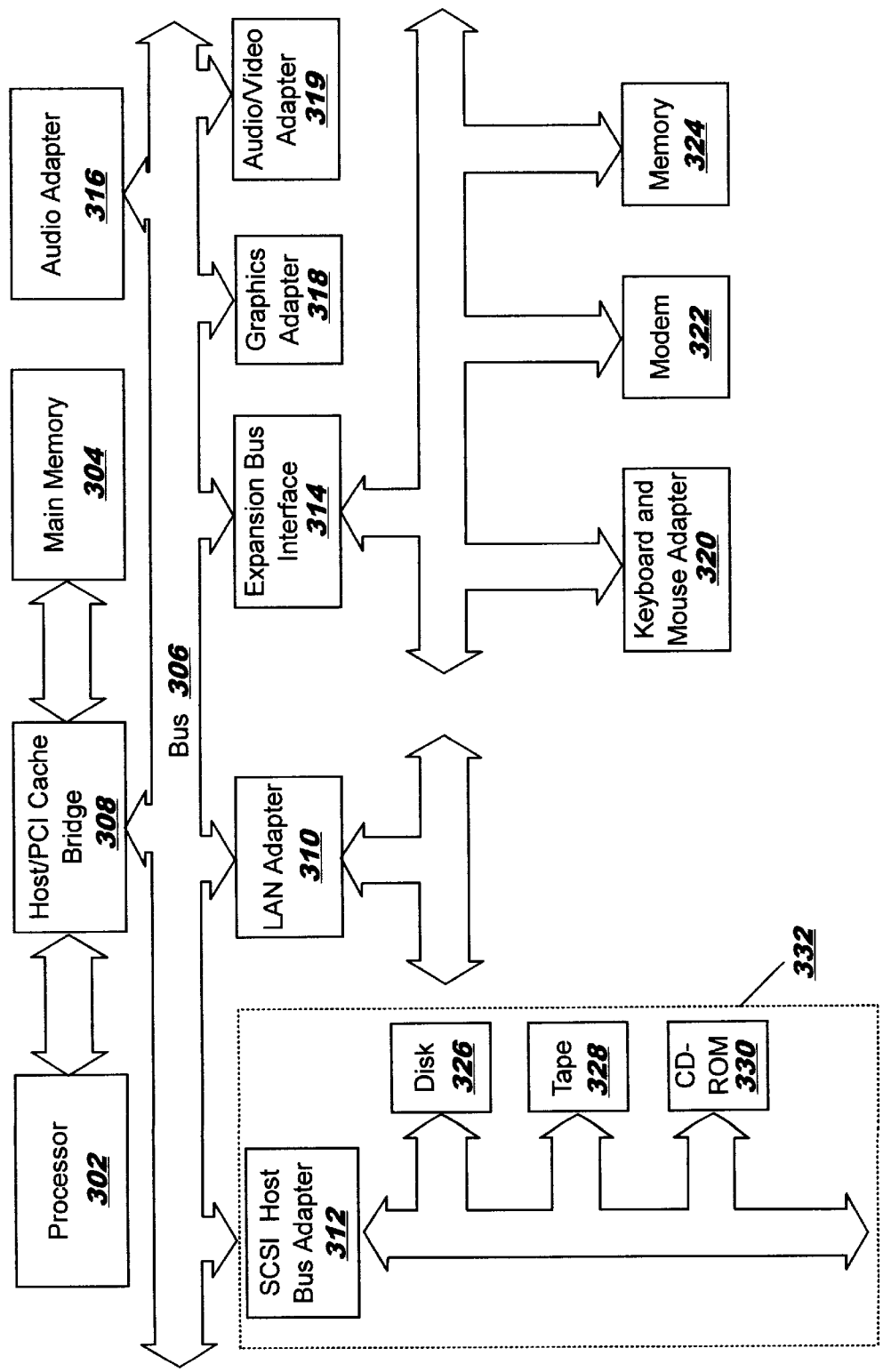
FIG. 3 is a block diagram illustrating a data processing system in which the present invention may be implemented.

With reference now FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, trademark of International Business Machines Corporation. An object oriented programming system, such as Java, a trademark of Sun Microsystems, Inc., may run in conjunction with the operating system and provides calls to the operating system from the Java programs or applications executing on data processing system 300. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multi processor data processing system.

For example, data processing system 300, if optionally configured as a network computer, may not include SCSI host bus adapter 312, hard disk drive 326, tape drive 328, and CD-ROM 330, as noted by the box with the dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user generated data.

The depicted example in FIG. 3 and above-described examples are not meant to imply architectural limitations with respect to the present invention. Although FIGS. 1–3 provide examples of configurations of computer systems on which the present invention may execute, the following background information may provide a context for understanding the overall computing environment in which the present invention may be used.

Software program code which employs the present invention is typically stored in the memory of a storage device 232 of a stand-alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

The prior art technique of "in-memory" translation uses previously translated content (translation memory) wherever possible, rather than re-translating the content every time it appears (as with Machine Translation techniques). One example for which in-memory translation techniques could be applied would be translating user documentation that is modified minimally across software releases. The first time a user manual is created, the entire document must be translated using human or automatic editing processes (or a combination of both). To then use translation memory (TM), a TM database must be set up. The database is created with entries that have (among other things) the original source data and its corresponding translated data (can be at phrase level, sentence level, paragraph level, etc.). The next release of the software and its user manual may have changes, for example, to only 10% of the original source document. Therefore, it does not make sense to translate the entire source again, and so one can automatically search a database using the source data about to be translated. When matches for sentences, etc are found, it's corresponding correct translation in the database is identified so no translation process for that data is necessary.

If no match is found, the unmatched source is translated by a human and both the source and the correct translation are added to the TM database. The following simple example further illustrates this concept.

A phrase in English such as, "The man is reading the manual from Sun." is to be translated into German. The prior art would attempt to look up this English phrase in a TM database and if, for example, a matching German entry is not found, this phrase would have to be added manually by a human translator (or with MT) with its translation in context which would be: "Der Mann liest das Handbuch aus Sun." Then, the next time such a sentence were to be translated, the correct matching translation would be present in the database. The database also might have to include correct translations for every idiomatic/contextual variation, and, thus, would soon become quite large and consume much storage space.

When it is decided to use Machine Translation (MT) techniques, an MT engine is called. The same phrase in English, "The man is reading the manual from Sun." is to be translated into German. Using Machine Translation algorithms the following malformed sentence may result: "Aus Sonne der Mann liest das Handbuch." If a statistical value of its accuracy is computed by the MT algorithms (as is known in the art), it would likely be low. A German speaking person could still understand the gist of the translation, but the idiomatic meaning is incorrect, and grammatically it is a very poor translation. Therefore, it would either need to be manually corrected or more likely, left as a malformed translation.

The present invention is essentially a hybrid of the existing TM art. Rather than storing all source text and it's corresponding correct translated text in the TM database, the present invention only stores poorly translated text that was created using MT. Utilizing the same example as above, the first time a user manual is created the entire document must be translated. This time, however, MT is used to translate the manual. The MT algorithms score sentences, phrases, etc. as to the quality of the translation. If the quality score is low, a human must intervene to correct it. In the case where the quality is low (i.e. below some arbitrary user defined threshold), a database is updated with the Machine Translation algorithm translated low quality text and the corresponding human corrected perfect translation text. This is in contrast to the previous example in which the database was updated with all the source text and the correct translation text. When subsequent modifications to the document occur and MT results in some portions having a low quality translation, a search of the database occurs using the low quality output translation. If a match is found, the corresponding correct human translation is substituted for the low quality translation. Therefore, a relatively small database is kept of only sufficiently low quality translations rather than a large database of all source sentences/phrases and their correct translations resulting in quicker response time, better translations, and less storage space usage. As the algorithms for Machine Translation get better the previous malformed entries in the database can be removed, thereby, further reducing the required storage space. Under the prior art usage of TM databases there is no opportunity to reduce the database, quite the opposite, it steadily grows.

Thus, in accordance with the present invention, a combination of Machine Translation techniques are used with a 'Hybrid' Translation Memory (HTM)database. The HTM database stores only malformed translated sentences matched with their correct translations rather than all sentences in a first language translated into a possible plurality of idiomatically/contextually correct translations in a second language. Each sentence that is translated with MT is analyzed by the MT algorithms to determine a value for the accuracy of the translation. If the accuracy is greater than or equal to a preset tolerance level, the sentence is considered to be translated sufficiently well. Therefore, no database need be checked for all the sufficiently translated sentences. However, if the accuracy is below the tolerance, an HTM database is checked for the same bad translation and if found, replaced with the matching correct translation. Since Machine Translation algorithms are generally sophisticated enough to produce reasonably correct translations, the HTM database needed to store malformed translations and their matching correct translations would likely be smaller than the typical TM database and less time would be consumed by required cross-checking.

Figure 4:
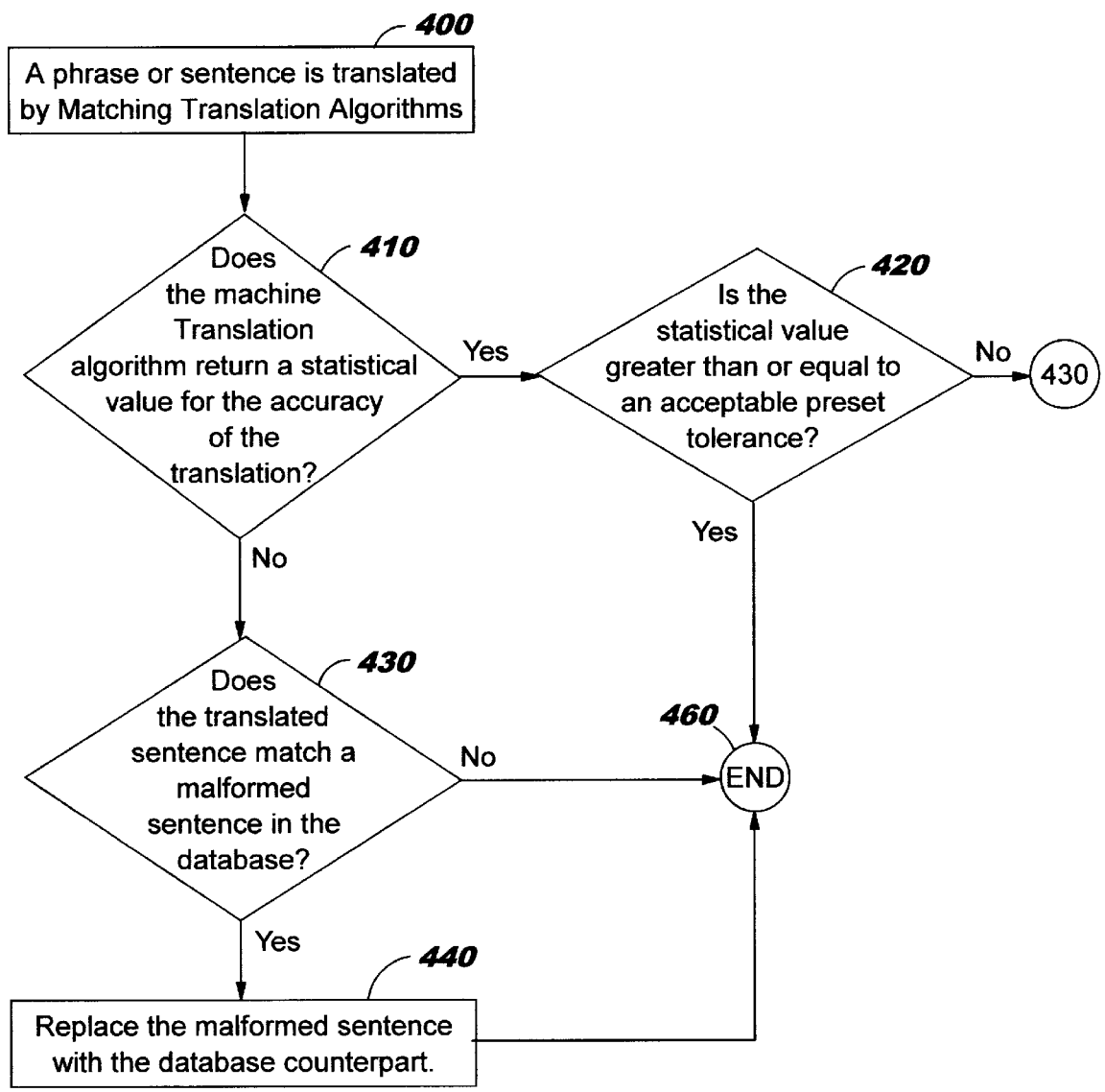
FIG. 4 is a flowchart illustrating the present invention.

The present invention will now be discussed in greater detail with reference to FIG. 4. At block 400 a phrase or sentence is translated by Machine Translation algorithms. At block 410, it is determined whether or not the Machine Translation algorithms return a statistical value for the accuracy of the translation. If the response to decision block 410 is yes, the present invention proceeds to decision block 420. At decision block 420, it is determined whether or not the statistical value is greater than or equal to an acceptable preset tolerance. If the response to decision block 420 is yes, the present invention ends at 460 since the translation is considered to be adequate.

If the response to decision block 410 or decision block 420 is no, the present invention proceeds to decision block 430, since the translation is not considered to be good enough. At decision block 430, it is determined whether or not the translated sentence matches a malformed sentence previously stored in a database (HTM). If the response to decision block 430 is yes, the malformed sentence is replaced with the correct matching translation previously stored in the database. If the response to decision block 430 is no or after block 440, the present invention ends at 460.

Figure 5:
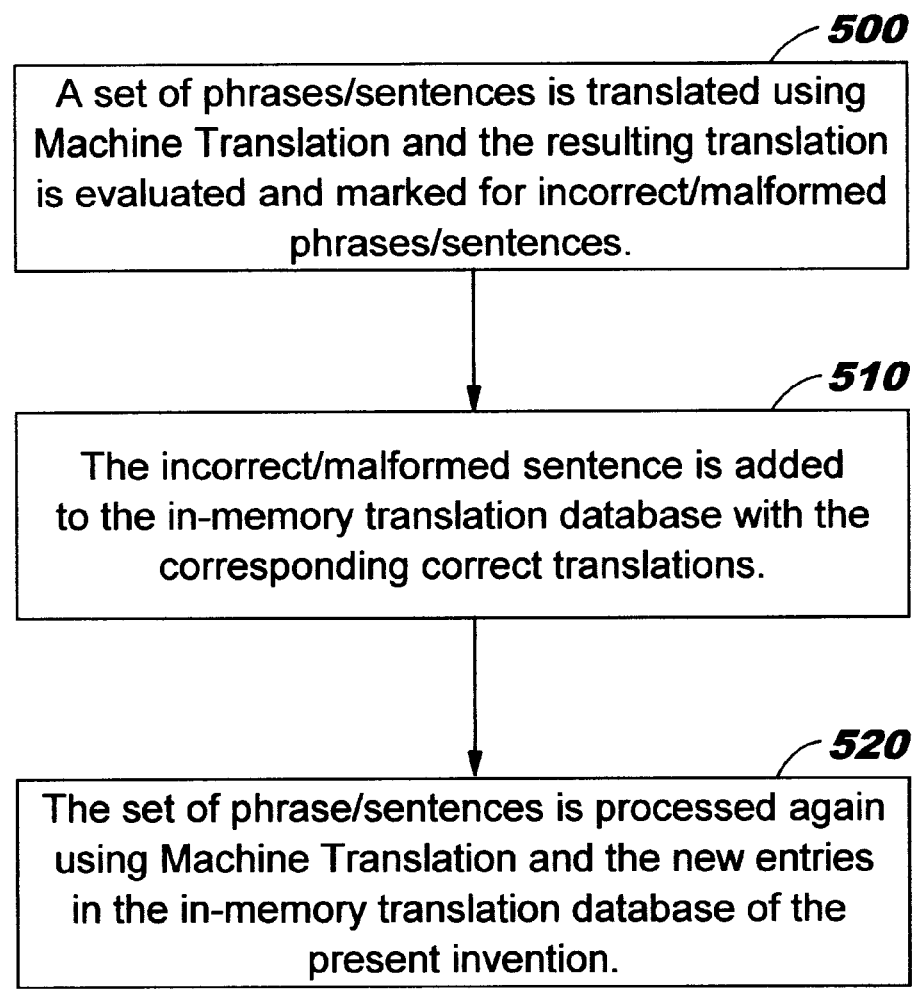
FIG. 5 illustrates priming the database with malformed sentences in accordance with the present invention.

Referring to FIG. 5, a flowchart illustrates how a Hybrid Translation Memory database for use with the present invention is originated. Initially the database does not contain any malformed sentences or their correct translations. At block 500 an origin document or a set of origin phrases/sentences are translated using Machine Translation. The translated document or translated set of phrases/sentences is proof read for accuracy, and the malformed sentences are noted. At block 510 the malformed sentences are added to the in-memory database with their correct translations. At block 520 the origin data is processed again using the database of the present invention. The Document is proof read again, and, this time, should be correct.

Although the present invention has been described with respect to a specific preferred embodiment thereof, various changes and modifications may be suggested to one skilled in the art and it is intended that the present invention encompass such changes and modifications as fall within the scope of the appended claims.

What we claim is:

1. A method of translating text from a first language into at least one second language, comprising the steps of:
   translating all of said text with a machine translation engine from the first language into the at least one second language resulting in a translated text comprising a plurality of portions;
   analyzing said translated text to determine a quality score for each of said plurality of portions of said translated text;
   accepting any of said plurality of portions of said translated text having a quality score greater than or equal to a predetermined value;
   searching a hybrid translation memory database for any of said plurality of portions of said translated text having a quality score below said predetermined value; and
   replacing any of said plurality of portions of said translated text having a quality score below said predetermined value with a pre-translated matched version of higher quality from said hybrid translation memory database; wherein said hybrid translation memory database comprises only malformed portions with a matching correct translation.

2. The method of claim 1, wherein said predetermined value is selectable.

3. The method of claim 1, wherein said step of analyzing said translated text to determine a quality score comprises assigning all portions a same value below said predetermined value, wherein all translated text is searched in said hybrid translation memory database.

4. A system for translating text from a first language into at least one second language, comprising:
   means for translating all of said text with a machine translation engine from the first language into the at least one second language resulting in a translated text comprising a plurality of portions;
   means for analyzing said translated text to determine a quality score for each of said plurality of portions of said translated text;
   means for accepting any of said plurality of portions of said translated text having a quality score greater than or equal to a predetermined value;
   means for searching a hybrid translation memory database for any of said plurality of portions of said translated text having a quality score below said predetermined value; and
   means for replacing any of said plurality of portions of said translated text having a quality score below said predetermined value with a pre-translated matched version of higher quality from said hybrid translation memory database; wherein said hybrid translation memory database comprises only malformed portions with a matching correct translation.

5. The system of claim 4, wherein said predetermined value is selectable.

6. The system of claim 4, wherein said means for analyzing said translated text to determine a quality score comprises means for assigning all portions a same value below said predetermined value, wherein all translated text is searched in said hybrid translation memory database.

7. A computer program product recorded on computer readable medium for translating text from a first language into at least one second language, comprising:
   computer readable means for translating all of said text with a machine translation engine from the first language into the at least one second language resulting in a translated text comprising a plurality of portions;
   computer readable means for analyzing said translated text to determine a quality score for each of said plurality of portions of said translated text;
   computer readable means for accepting any of said plurality of portions of said translated text having a quality score greater than or equal to a predetermined value;
   computer readable means for searching a hybrid translation memory database for any of said plurality of portions of said translated text having a quality score below said predetermined value; and
   computer readable means for replacing any of said plurality of portions of said translated text having a quality score below said predetermined value with a pre-translated matched version of higher quality from said hybrid translation memory database; wherein said hybrid translation memory database comprises only malformed portions with a matching correct translation.

8. The program product of claim 7, wherein said predetermined value is selectable.

9. The program product of claim 7, wherein said computer readable means for analyzing said translated text to determine a quality score comprises computer readable means for assigning all portions a same value below said predetermined value, wherein all translated text is searched in said hybrid translation memory database.

* * * * *